United States Patent Office 3,435,237
Patented Mar. 25, 1969

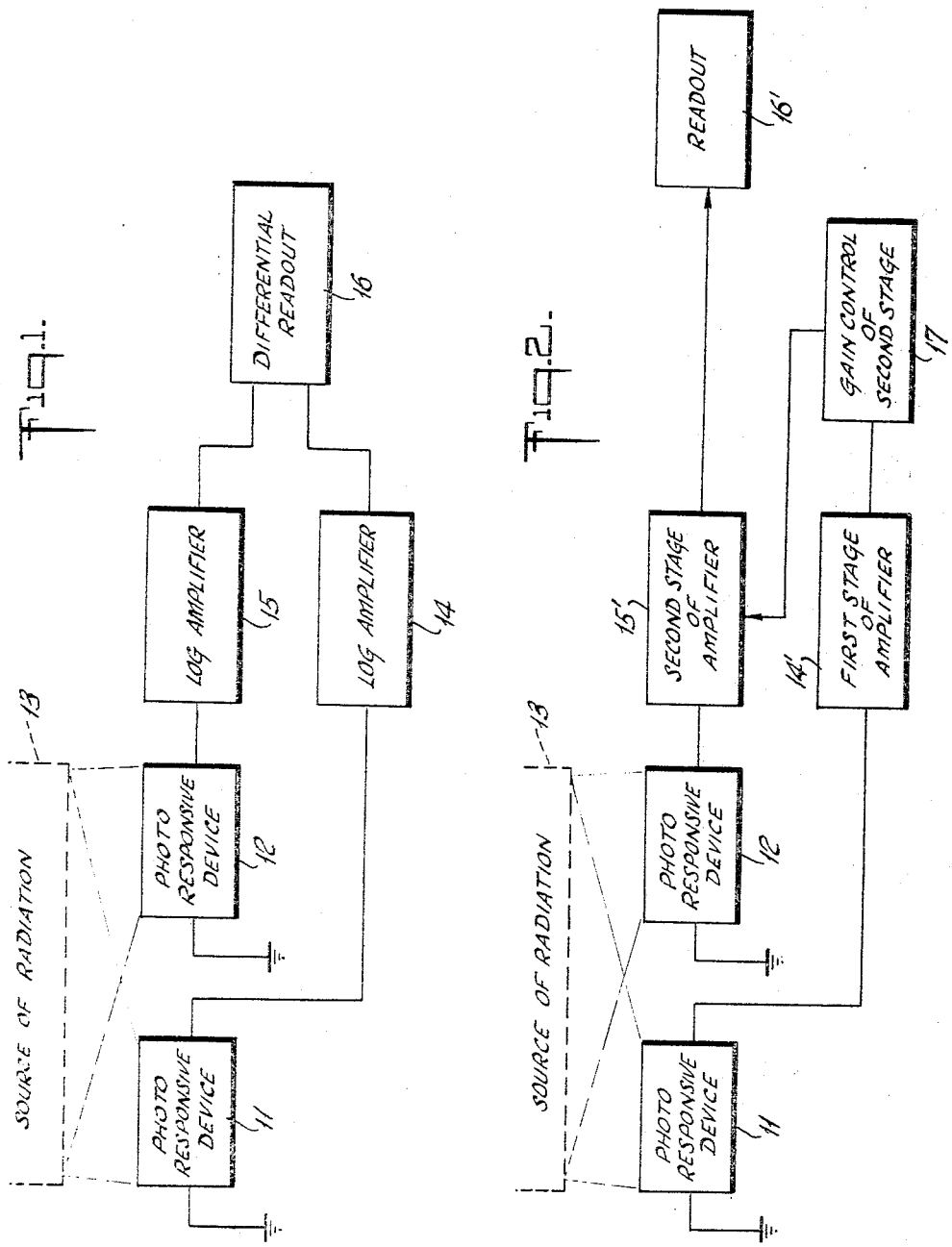

3,435,237
RADIATION DISCRIMINATOR MEANS
Frank C. Collins, Brooklyn, N.Y., assignor to PRD Electronics, Inc., Brooklyn, N.Y., a corporation of New York
Filed Jan. 21, 1965, Ser. No. 426,732
Int. Cl. H01j 39/12; G01k 11/00
U.S. Cl. 250—214                                     2 Claims

ABSTRACT OF THE DISCLOSURE

A device for sensing radiation from a body which device includes a pair of photo sensors having different optical characteristics and circuit means for developing a ratio of the output of the photo sensors. The circuit means includes a pair of logarithmic amplifiers and a differential readout device coupled to the output of each of the amplifiers.

---

The instant invention relates to photometric systems which are used to measure electromagnetic radiation. In particular, the invention relates to the measurement of a specific radiation intensity, such as that of temperature of a hot body, by means of a system adapted to discriminate the total distribution of the sensed radiation so as to permit measurement of one particular energy characteristic.

In the past, various instruments have been used to measure the total intensity of electromagnetic radiation from a given source. These instruments called photometers have been successfully constructed using thermopiles, or semiconductor devices, such as photoconductors or photodiodes. Photometers will measure the total radiation integrated over some region of the spectrum in terms of intensity per unit area. The intensity may be in terms of energy or photons per unit time. The response of the photometer to a given signal will depend on both the physical properties, geometric arrangement of the source and the detection system. The differential intensity will be a function of the wavelength, temperature and emission coefficient of the source. The other variables include: the area of the source, or the solid angle of the source surface visible to the detector, and the distance from source to the detector.

For some given spectral distribution such as that of a black body at a fixed temperature, the photometer may be used to yield information as to the magnitude of the area of the source radiation or the distance between the source and the photometer. Alternatively, for a fixed distance from the radiator and a given area of source, the photometer can be calibrated to indicate variations in the spectral distribution such as that from a black body at various temperatures. However, a single photometer cannot yield both the geometric properties as well as the spectral distribution. Instances where the temperature of the radiating body is to be measured, prior art instruments cannot give a direct reading number. Optical pyrometers are commonly used. These instruments require a comparison of color and shades with a prepared standard to determine temperature.

This invention contemplates the use of two photometric devices which have a systematic difference in response. The specific photometers to be used may be any conventional device based on the measurement of energy as in a thermopile or upon the optical generation of carriers, as in a photoconductor, photodiode, or barrier layer cell. The output signals from the two photometers, which are of different characteristics, are in fixed proportion for any given spectral distribution. The ratio of the two signals will provide a number which is independent of the geometric aspects of the system. If the spectral distribution varies, the signals of the two photometers will change relative to each other. The system can then be used to determine the change in the spectral distribution to determine the temperature in a source, such as a radiant body or to detect the presence of a source emitting a characteristic spectrum.

One object of the invention is to provide means involving a photometric system which will enable the measurement of a single energy parameter of a radiating source.

Another object of the invention is to provide means and method for measuring the temperature of a radiating surface independently of the area of the source and its distance from the measuring system.

A further object is to provide means for discriminating between radiation from two different sources having different spectrums.

Further objects and advantages will become apparent from the following description of the invention taken in conjunction with the figures, in which:

FIG. 1 is a block diagram of the instant invention, and

FIG. 2 is a block diagram of an alternative embodiment of the invention.

Two photo-responsive devices 11 and 12 are exposed to a source of radiation 13. The two devices 11, 12 may be any suitable device for measuring electromagnetic radiation. The two devices 11, 12 must differ from each other. Any systematic difference in response of the photo-responsive devices will suffice to operate the system. The difference in response may be brought about by filtering the incident radiation from source 13 on devices 11, 12. Another simple method is to use two semiconductors which have differing optical cut-off, whereby each device 11, 12 responds to a different fraction of the spectrum although it is of no concern if the responses overlap. Such two semiconductors may typically be germanium and lead sulfide, which have optical cut-off at 1.7 and 3.4 microns respectively.

Each photometric device 11, 12 when exposed to the source of radiation 13 will provide a different indication of the incident radiation, because of the functional differences of devices 11, 12. The ratio of the two responses is then determined.

One way to determine this ratio of responses employs logarithmic amplification. With reference to FIG. 1, the output of device 11 is passed through a log-amplifier 14. The output of device 12 is passed through a log-amplifier 15. Log-amplifiers 14, 15 provide the logarithmic equivalents of the respective responses. The ratio can then be determined by taking the difference between the logarithmic equivalents. A differential readout 16 subtracts the two logarithmic values and on a calibrated scale indicates the value of the ratio of the two responses. The readout 16 may be replaced by, or control, the operation of a warning system.

The present invention is not confined to the use of logarithmic amplification to determine the ratio of the signals of the two photoconductive devices. Such an alternative method is shown in FIG. 2. The signal from device 11 is amplified in the first stage 14' of a two stage amplifier. Stage 14' has a fixed gain. The output of stage 14' is fed into the gain control 17' of the second stage 15' of the two stage amplifier. The gain control 17' is such that the gain of stage 15' decreases with increasing output from stage 14'. The signal from photo-device 12 is amplified in stage 15' of the two stage amplifier. It will be seen that the output of stage 15' will be a function of the ratio of the signals from the two photo-devices 11 and 12. The output of stage 15' is fed into a conventional readout device 16'. A combination of servomotors operated by signals from devices 11 and 12 will also achieve the purpose of measuring the ratio of the two signals. Other electrical networks to accomplish the same end will be obvious to those skilled in the art.

Each detector 11, 12 individually measures the intensity of radiation as a function of the physical and geometric parameters of the system. However, the ratio of the two responses eliminates these latter quantities. The ratio of the two responses can then provide information concerning the spectral form of the incident radiation and, in particular, can provide a quantitative value for determining the temperature of the radiating surface.

An examination of the mathematical formulas will serve as an illustration of the operation of one form of system embodying the present invention.

A single device will determine the useful radiation falling on a planar detector in terms of photons per unit area per unit time. If detector has an optical cut-off at a frequency $V_c$, incidental photons having less than this frequency do not excite photoelectrons to be measured. The detector is at a distance $r$ from a black body and is oriented at an angle $\theta$ thereto. The black body of effective area $A$ occupies a solid angle $w$ and of a half sphere of solid angle potentially visible to the detector. From these geometrical considerations and Planck's law, this useful radiation is given by:

$$I = A \frac{w \cos \theta}{r^2} \int_{V_c}^{\infty} \frac{2\pi V^2 dV}{c^2 [\exp(hV/kT) - 1]} \quad (1)$$

where $h$ is Planck's constant, $k$ is Boltzmann's gas constant per particle, $T$ is the absolute temperature of the radiant black body, and $c$ is the velocity of light. Since $hV_c$ is much larger than $kT$, unity may be neglected in the denominator of the integrand compared with the exponential. The integration may then be readily effected:

$$I = A \frac{w \cos \theta}{r^2} \left[ \left(\frac{hV_c}{kT}\right)^2 + 2\left(\frac{hV_c}{kT}\right) + 2 \right] \exp\left(\frac{-hV_c}{kT}\right) \quad (2)$$

The ratio of the readings of two devices 11, 12 which have different optical cut-off frequencies $V_c$ and $V_c'$ is given by:

$$X = M \frac{I'}{I} =$$

$$M \frac{\left[\left(\frac{hV_c'}{kT}\right)^2 + 2\left(\frac{hV_c'}{kT}\right) + 2\right] \exp(-hV_c'/kT)}{\left[\left(\frac{hV_c}{kT}\right)^2 + 2\left(\frac{hV_c}{kT}\right) + 2\right] \exp(-hV_c/kT)} \quad (3)$$

where $I'$ is from Equation 2 by substituting $V_c'$ for $V_c$, and $M$ is the ratio of the quantum efficiencies of the two devices 11, 12. It will be observed that the geometrical quantities cancel. Under the conditions that the temperature of the black body is 400° C. and the optical cut-offs occur at wavelengths of 3 microns and 5 microns, respectively, the value of $X$ obtained is 0.136. The ratio of quantum efficiencies has been assumed to be unity.

Equation 3 is then differentiated with respect to temperature to obtain the quantity:

$$dX/dT \quad (4)$$

Dividing Equation 4 by $X$ gives the fractional amount $X$ changes per degree. This quantity is the temperature coefficient. In the above example, the temperature coefficient is 0.4% per degree centigrade.

The invention is not necessarily limited to the use of two devices. A plurality of devices with differing responses may be used in order to discriminate between the radiation from two different sources having different spectra. If two sources of radiation are exposed, there would be one composite total spectrum. This spectrum would actually be the spectrum of the body 2 superimposed upon body 1. If two devices are used, A and B, of functional differences, two responses will be obtained. The ratio $A/B$ will give information about the total spectrum composed of spectro 1 and spectra 2. Two additional devices are exposed, C and D, with functional differences to each other and to the first set. Some function of the two ratios, such as its sum $A/B + C/D$, its difference $$A/B - C/D$$

or its ratio $$\frac{C/D}{A/B}$$

would enable the calculation of how much of spectrum 1 was included in the radiation falling on the devices.

The system of a plurality of devices can be used to detect the re-entry of a missile into the atmosphere. A particular range of values of the simple ratio $A/B$ or the composite ratio $$\frac{C/D}{A/B}$$

is characteristic of the electromagnetic spectrum emitted by a re-entering missile or space vehicle.

The basic invention can be adapted to serve as a warning system, where the signal given is dependent on temperature rather than total intensity of radiation. Since the system can be calibrated to read temperature directly, it can be connected to a signal device which indicates when a particular temperature is reached. Such systems may find usage in fire alarms or proximity detectors of hot bodies.

In cases of no radiation or low radiation levels, the readings of the photometers will be close to zero and the ratio resulting will be erratic. To prevent such readings, a lower level switch may be attached to the system. When either one of the photometers reads below a specified level, a signal is given to indicate this condition.

It is intended that all matter contained in the above description or shown in the accompanying drawing shall be interpreted as illustrative and not in a limiting sense.

What is claimed is:

1. Electromagnetic radiation detection means comprising, photometric means for sensing incident radiation and having different optical cut-off frequencies, log-amplifying means for providing logarithmic equivalents of said respective responses, and differential readout means for providing a ratio of said respective radiation responses, whereby the temperature of a radiating source may be determined without knowledge of the geometric photometrics thereof.

2. An electromagnetic radiation measuring system comprising, two radiation sensors of differing response, a pair of amplifier means for amplifying respective signals from corresponding sensors, and a gain regulating device for one of said amplifiers controlled by the output of the other amplifier means, whereby the output of said system is a function of the ratio of the signals from said two sensors.

References Cited

UNITED STATES PATENTS

| | | | |
|---|---|---|---|
| 2,658,390 | 11/1953 | Machler | 73—355 |
| 2,695,364 | 11/1954 | Wolfe | 73—355 X |
| 2,845,528 | 7/1958 | Brook. | |
| 2,860,241 | 11/1958 | Post | 328—161 X |
| 3,137,170 | 6/1964 | Astheimer | 73—355 |
| 3,237,028 | 2/1966 | Gibbons | 328—145 X |
| 3,255,417 | 6/1966 | Gottlieb | 328—145 |
| 3,321,630 | 5/1967 | Durig et al. | 250—214 X |

OTHER REFERENCES

Burk, "The Ratio Pyrometer," from Instruments and Control Systems, vol. 33, January 1960, pp. 64–67.

RALPH G. NILSON, *Primary Examiner.*

M. LEAVITT, *Assistant Examiner.*

U.S. Cl. X.R.

73—355